United States Patent
Kumarjiguda et al.

(10) Patent No.: US 8,380,820 B1
(45) Date of Patent: Feb. 19, 2013

(54) SENDING SYNCHRONOUS RESPONSES TO REQUESTS FROM FRONTEND APPLICATIONS

(75) Inventors: Meera Deshpande Kumarjiguda, Edison, NJ (US); Shankar Kulkarni, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 129 days.

(21) Appl. No.: 13/082,842

(22) Filed: Apr. 8, 2011

(51) Int. Cl.
*G06F 15/16* (2006.01)
(52) U.S. Cl. .................................. 709/219; 709/224
(58) Field of Classification Search .......... 709/200–203, 709/217–227
See application file for complete search history.

(56) References Cited

U.S. PATENT DOCUMENTS

| | | | | |
|---|---|---|---|---|
| 6,070,190 | A * | 5/2000 | Reps et al. | 709/224 |
| 7,680,928 | B2 * | 3/2010 | Lean et al. | 709/224 |
| 7,756,094 | B2 * | 7/2010 | Ho | 370/338 |
| 7,827,152 | B1 * | 11/2010 | Gangasharan et al. | 707/686 |
| 8,103,758 | B2 * | 1/2012 | Miura et al. | 709/223 |

OTHER PUBLICATIONS

Websphere Message Broker—Software by IBM, http://www-01.ibm.com/software/integration/wbimessagebroker/, retrieved on Apr. 7, 2011.

* cited by examiner

*Primary Examiner* — Moustafa M Meky

(57) ABSTRACT

An enterprise middleware program system receives service requests from frontend applications. The service requests are sent to a backend application for processing and a timeout established by the frontend applications for processing the service requests is identified by intermediary nodes. The system monitors for responses regarding results of processing the requests from the backend application. If a response to one of the service requests is received from the backend application by one of the intermediary nodes prior to the timeout elapsing, the response is sent to the frontend application from which the request was received; whereas, if a response is not received prior to the timeout elapsing, the system sends a timeout message to the frontend application in lieu of the response.

19 Claims, 4 Drawing Sheets

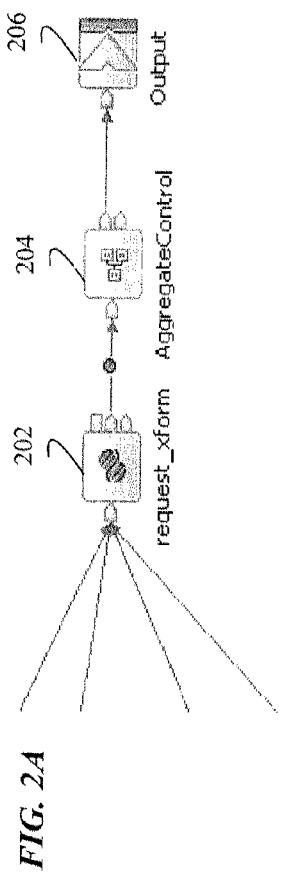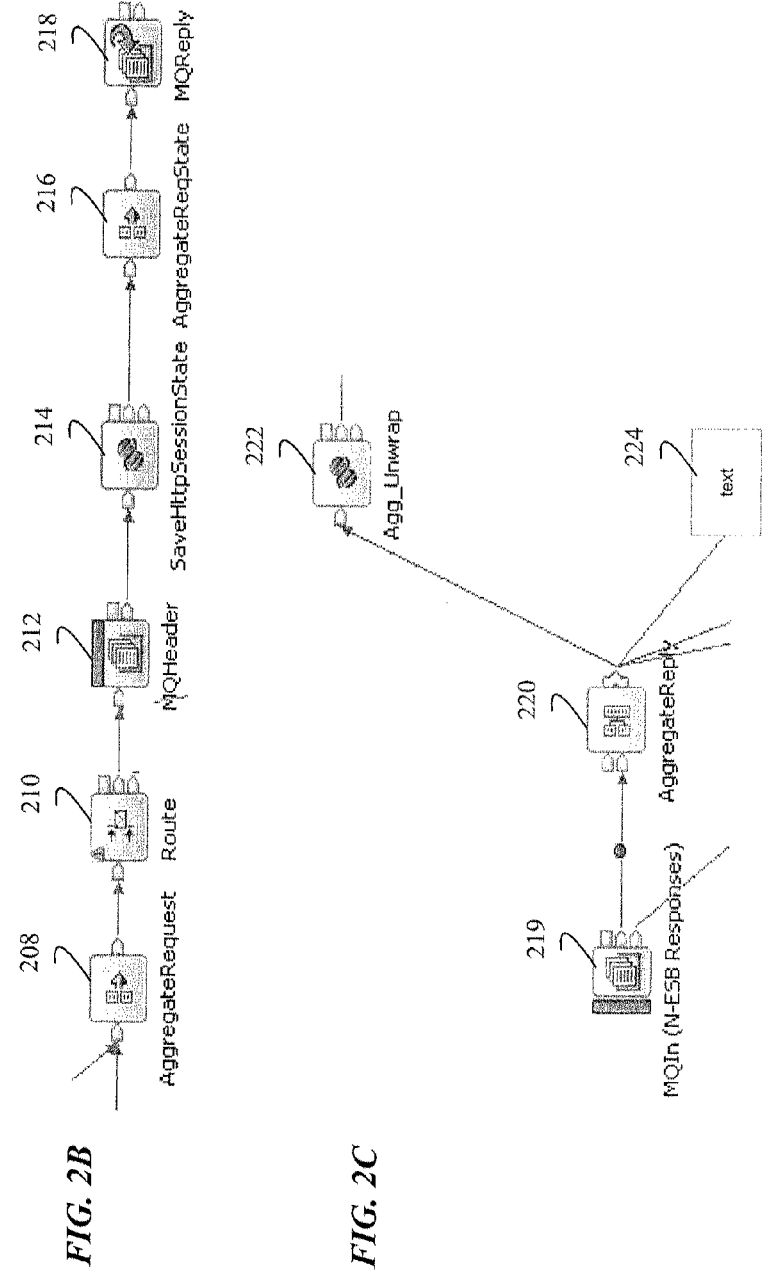
FIG. 2A
FIG. 2B
FIG. 2C

SENDING SYNCHRONOUS RESPONSES TO REQUESTS FROM FRONTEND APPLICATIONS

TECHNICAL FIELD

The present subject matter relates to techniques and equipment that insure a synchronous response, e.g., in the context of IBM Web Sphere Message Broker (WMB), is sent to a frontend application even in the situations when there is no response from a backend application within a time period established by the frontend application.

BACKGROUND

For a quick turn-around time for middleware projects and with fewer infrastructures to manage, the WMB was selected as a technology for middleware development. The WMB translates a message from a formal messaging protocol of a sender to a formal messaging protocol of a receiver. A typical middleware application interfaces with the backend and makes available the backend Application Program Interfaces (APIs) to one or more frontend applications. The WMB also interfaces with a database for reporting requirements. The Subscriber Device Management IT-Enterprise Service Bus (SDM IT-ESB) application is one such middleware application. It provides an XML/HTTP interface to frontend applications such as, for example, an Automated Customer Support System (ACSS), a Subscriber Device Management User Interface (SDMUI), and a Point of Sale (POS). The backend interface to the SDM IT-ESB is on a Message Queue (MQ), which is a queue for messaging (e.g., passing of control or of content) between the SDM IT-ESB and the backend application.

Communication over MQ is asynchronous in nature. Once the request is placed on a request queue, the backend application consumes the request, processes it and places the backend application response into a reply queue. The requesting application, the SDM IT-ESB, then consumes the backend application response, when the backend application response becomes available and processes it. The result of processing by the SDM IT-ESB is dependent on the frontend application expecting the result.

While the SDM IT-ESB performs in an asynchronous fashion with relation to the backend application, some frontend applications such as the ACSS, SDMUI, and POS may need a synchronous response. To this end, the frontend application continues to wait for the SDM IT-ESB to send the backend application response even though the SDM IT-ESB has not received a response from the backend application. This may not be problematic when timing issues do not arise, e.g., when the response is provided in a relatively short amount of time or for frontend applications that do not have timing requirements. However, difficulties occur in situations in which the frontend application has a timing requirement and expects the backend application response before a timeout for processing the request is reached. Sometimes, the SDM IT-ESB does not receive the backend application response within the set timeout and as a result is unable to send the backend application response to the frontend application before the timeout is reached. To address this problem, the WMB includes a timeout node, which is used to send an error message to the frontend application when the timeout set in the timeout node is reached and no response is received from the backend application. The timeout set in the timeout node of the WMB, however, is not meeting the required timeout for the frontend applications. Specifically, the required timeout for the frontend application is less that the timeout set in the timeout node of the WMB, and the timeout node of the WMB cannot be adjusted by the mobile service provider (e.g., Verizon Wireless™) to meet the timeout for the frontend application.

SUMMARY

It is thus desirable to provide a means for overcoming the above-identified problem. In particular, it is desirable to provide a method whereby a synchronous response is sent to the frontend application even in the situations when there is no response from the backend application within a time period (timeout) established by the frontend application.

In one general aspect, the instant application describes a method comprising steps of: (a) receiving first and second service requests from one or more frontend applications at an enterprise middleware application system; (b) forwarding the first and second service requests to an AggregateControl node of the enterprise middleware application system; (c) identifying, at the AggregateControl node, a timeout required for processing the first and second service requests; (d) sending the first and second service requests to a backend application for processing, and monitoring, at the AggregateReply node, for responses regarding results of processing of the first and second service requests; (e) upon receiving, at the AggregateReply node, a first response from the backend application regarding the result of processing of the first service request before the timeout elapses, sending the first response to a corresponding frontend application from which the first service request was received; and (f) in response to the timeout for the second service request elapsing before receiving, at the AggregateReply node, a second response to the second service request from the backend application, sending a third response informing the corresponding frontend application from which the second service request was received that the backend application has not responded to the second service request.

The above general aspects may include one or more of the following features. The one or more frontend applications may include one or more of an Automated Customer Support System (ACSS) server, a Subscriber Device Management User Interface (SDMUI) server, and a Point of Sale (POS) server. The timeout may be a predefined property at the AggregateControl node. The AggregateControl node may send a control message to the AggregateReply node of the enterprise middleware application system. The control message may identify the timeout at the AggregateReply node. The first and second service requests may be from the same frontend application. Alternatively, the first and second service requests may be from two different frontend applications.

The method may further include a step of sending the first and second service requests to an AggregateRequest node of the enterprise middleware application system. The AggregateRequest node may mark the first and second service requests as first and second aggregate service requests, respectively. The method may further include steps of generating first and second stage messages that respectively correspond to the first and second service requests; sending the first and second stage messages to the AggregateReply node; and in response to the timeout for the second service request elapsing before the second response is received at the AggregateReply node, sending the second stage message as the third response and in place of the second. The third response may include a timeout response. The first and second service requests from the one or more frontend applications may require synchronous responses.

Implementations of the described techniques may include hardware, a method or process, or software for a mobile device on a computer-accessible medium.

The details of one or more implementations are set forth in the accompanying drawings and the description below. Other features will be apparent from the description and drawings, and from the claims.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 2A-2C illustrate how the aggregate nodes of an IT-ESB interface shown in FIG. 1 may be used to send the synchronous response to the frontend applications, including in situations when there is no response from the backend application within a set timeout period.

DETAILED DESCRIPTION

Figure 1:
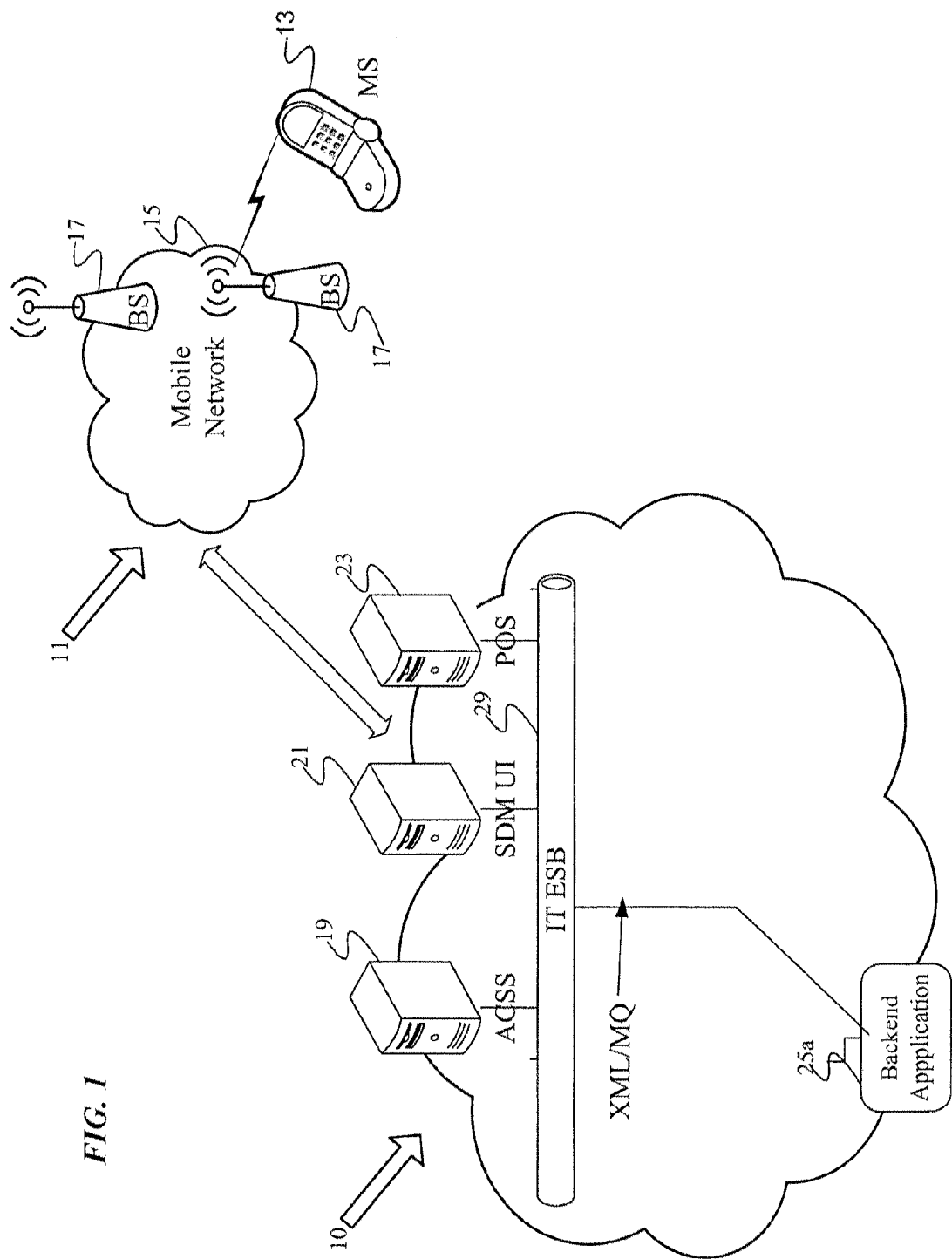
FIG. 1 illustrates a system implementing a technique for aggregating message traffic requiring backend processing in a manner that insures a response required for synchronous processing by requesting frontend applications in the context of a mobile network that may utilize services or functions of the system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various techniques and systems disclosed herein relate to handling of message traffic requiring backend processing in a manner that facilitates synchronous service for frontend applications. The solution may be applied in the context of an enterprise middleware application system. For example, aggregate nodes in the WMB send responses in timeout situations.

The WMB provides three message flow nodes that support aggregation: an AggregateControl node, an AggregateRequest node, and an AggregateReply node. Aggregation is the generation and fan-out of related requests derived from a single input message and the fan-in of the corresponding replies to produce a single aggregated reply message. More specifically, the initial request received by the message flow is split into an appropriate number of individual requests to satisfy the subtasks of the initial request. This process is known as fan-out and is provided by a message flow that includes the above-mentioned aggregation nodes. After the subtasks are processed by individual applications, replies from the individual applications to the individual requests are combined and merged into a single reply that is returned to the original requester (or another target application) to indicate the completion of the processing. This process is known as fan-in, and is also provided by a message flow that includes aggregation nodes.

According to techniques discussed in the instant application, the aggregate nodes of WMB are not used to fan-out related requests or fan-in corresponding replies as in the traditional sense. Instead, the aggregate nodes in the instant application are used to send a single request corresponding to a single input message and a single reply corresponding a single reply message. Specifically, the aggregation nodes are used to process message traffic using backend processing in a manner that insures a response required for synchronous processing by requesting frontend applications.

To illustrate, the request having a particular timeout for response arrives from a frontend application at the AggregateControl node. The AggregateControl node marks the beginning of the requests that are part of an aggregation and identifies the timeout required for the request. For example, the processing at the AggregateControl node marks the header of the requests. The timeout is a predefined property at the AggregateControl node. The timeout defines the amount of time the AggregateReply node waits to receive a response from the backend application to the request. Once the timeout is reached, the AggregateReply node no longer waits for the backend application response and instead sends a state message (e.g., a timeout response) to the frontend application. In one example, the timeout is set based on the user experience to an amount that is reasonable to the user (e.g., between 50 to 240 seconds) In one example, the user identifies the average amount of time the backend application takes to process requests from frontend applications, and the user sets the timeout to the identified average time.

In one implementation, the AggregateControl node and the AggregateReply node form a pair with a unique name such that setting the timeout at the AggregateControl node also automatically sets the timeout at the AggregateReply node. The pairing of the corresponding AggregateControl and AggregateReply nodes is done based on their unique name. In another implementation, to set the timeout in the AggregateReply node, the AggregateControl node sends a control message to the AggregateReply node. The control message identifies the timeout at the AggregateReply node.

In one scenario, where the frontend applications all have the same timeout, the WMB includes one set of aggregate nodes. In another scenario, where the frontend applications have different timeouts, the WMB includes multiple sets of aggregate nodes, each set including a different timeout. In the examples described in the instant application, it is assumed that all the frontend applications include the same timeout.

The AggregateReply node waits for the backend application response until the timeout elapse and once the timeout elapses, the AggregateReply node no longer waits for the backend application response and sends a state message to the frontend application from which the request was received. The state message is a timeout response, which is informs the frontend application that no response was received from the backend application within the set timeout. Alternatively, if the backend application response is received before the timeout elapse, the AggregateReply node forwards the backend application response to the frontend application.

Once a request has been received, the AggregateControl node places the request in an output queue. From the output queue, the backend application consumes the request, processes the request, and places the backend application response in a reply queue. Then, the SDM IT-ESB consumes the backend application response and forwards it to the frontend application through the AggregateReply node. In addition to being placed on the output queue, the request is also forwarded to the AggregateRequest node. At the AggregateRequest node, the request is labeled as an aggregate request. This notifies the AggregateReply node that it should expect a backend application response for at least one aggregate request. The aggregate request is then routed to an MQheader node, which adds proper header information for the aggregate request. The header information identifies a reply queue in which the aggregate request is to be placed. The aggregate request is then transformed into a state message (e.g., a timeout response). The state message is placed on the reply queue. The SDM IT-ESB then consumes the state message and forwards it to the AggregateReply node.

The AggregateReply node waits to receive a response from the backend application until the timeout is reached. If the backend application response is received before the timeout is reached, the backend application response is forwarded to its corresponding frontend application. Once the timeout is reached, the AggregateReply node no longer waits for the backend application response and sends the state message (e.g., the timeout response) to the frontend application in lieu of the not-yet-received response from the backend application.

Reference now is made in detail to the examples illustrated in the accompanying drawings and discussed below. FIG. 1 illustrates a system 10 implementing a technique for aggregating message traffic requiring backend processing in a manner that insures a response required for synchronous processing by requesting frontend applications. The technique may be applied in various systems, for example, implemented using the WMB for an enterprise. In the example, the enterprise is a company offering mobile communication services; therefore, the system 10 provides a variety of data processing functions in support of operations of a mobile communication network 11.

Toward this end, the system 10 includes servers 19, 21, and 23, all of which communicate with a backend application 25a through an IT-ESB interface 29. The server 19 includes an ACSS application for handling customer calls and is the frontend system. The server 21 includes SDMUI application for providing a user interface for subscriber device management and may be used for in-house testing/trouble shooting. The server 21 provides device management services and enables device related operations such as, for example, device profile, lock, unlock, wipe, etc. The server 23 includes a POS point of sale application.

The frontend applications interface with the backend application through the IT-ESB interface 29. The IT-ESB interface 29 is a software infrastructure that simplifies the integration and flexible reuse of business components within a service-oriented architecture. The IT-ESB 29 translates a message from the formal messaging protocol (e.g., HTTP/XML) of the sender to the formal messaging protocol (e.g., MQ) of the receiver. In this specific example, the IT-EST interface 29 translates a message from the formal messaging protocol (e.g., HTTP/XML) of frontend applications (e.g., servers 19, 21, and 23) to the formal messaging protocol (e.g., MQ) of the backend application 25a. In one implementation, the IT-ESB interface 29 provides message flow nodes that support aggregation. The nodes include an AggregateControl node, an AggregateRequest node, and an AggregateReply node. The aggregate nodes are used in a manner that insures a response required for synchronous processing by requesting frontend applications. This is described in more detail with respect to FIG. 2 below.

FIG. 1 also illustrates a system or network 11 offering a variety of mobile communication services to users of any number of mobile stations. The example shows simply one mobile station (MS) 13 as well as a general cloud representation of a mobile communication network 15. The network 15 provides mobile wireless communications services to any number of mobile stations 13, for example, via a number of base stations (BSs) 17. The network 15 generally may be any of a variety of available mobile networks, and the drawing shows only a very simplified example of a few elements of the network for purposes of discussion here. The network 15 allows users of the mobile stations such as MS 13 to initiate and receive telephone calls to each other as well as through the public switched telephone network or "PSTN" (not shown) and telephone stations connected to the PSTN. The network 15 typically offers a variety of other data services via the Internet, such as downloads, web browsing, email, etc. The system 11 also includes or communicates with a number of systems operated by the carrier in support of its network services, in this case including the system 10, implemented as an enterprise middleware application system. The system 10 may provide a variety of data processing functions in support of a carrier's operations of the network 11, such as billing and provisioning.

FIGS. 2A-2C illustrate how the aggregate nodes of IT-ESB interface 29 shown in FIG. 1 are used to send the synchronous response to the frontend applications, in situations where timeout is reached and no response is received from the backend application. As noted above, the IT-ESB interface 29 includes three aggregate nodes: the AggregateControl node, the AggregateRequest node, and the AggregateReply node. FIG. 2A illustrates an exemplary flow associated with the AggregateControl node. FIG. 2B illustrates an exemplary flow associated with the AggregateRequest node. FIG. 2C illustrates an exemplary flow associated with the AggregateReply node.

The exemplary flows associated with the various aggregate nodes are used to process message traffic requiring backend processing in a manner that insures a response required for synchronous processing by requesting frontend applications. Referring to FIG. 2A, a request having a particular timeout for response arrives from a frontend application at a request_xform node 202. The request arrives from the server 19 or server 23, for example. The request_xform node 202 transforms the request to make it compliant with the format of the backend application. The request_xform 202 then forwards the request to the AggregateControl node 204.

The AggregateControl node 204 marks the beginning of the requests that are part of an aggregation and identifies the timeout required for requests. For example, the processing at the AggregateControl node 204 marks the header of the requests. The AggregateReply node 220 waits for the backend application response until the timeout elapse and once the timeout elapses, the AggregateReply node 220 no longer waits for the backend application response and sends a timeout responses to the frontend application. The timeout is a predefined property at the AggregateControl node 204 and is, for the purpose of this example, the same for the various frontend applications.

In one implementation, the AggregateControl node 204 and the AggregateReply node 220 form a pair with a unique name such that setting the timeout at the AggregateControl node 204 also automatically sets the timeout at the AggregateReply node 220. The pairing of the corresponding AggregateControl node 204 and AggregateReply node 220 is done based on their unique name. In another implementation, to set the timeout in the AggregateReply node 220, the AggregateControl node 204 sends a control message to the AggregateReply node. The control message identifies the timeout at the AggregateReply node 220.

When the timeout is reached and no backed application response is received at the AggregateReply node 220, the AggregateReply node 220 sends a state message such as a timeout response to the frontend application from which the request was received. Meanwhile, the request is still being processed at the backend application. Once the backend application completes its processing of the request, the backend application sends its response to the AggregateReply node 220. The AggregateReply node 220 will not be able to recognize this backend application response since the AggregateReply node 220 has already sent a state message (e.g., a timeout response) to the frontend application in response to the request. Therefore, the AggregateReply node 220 sends the backend application response to the mobile service provider. The mobile service provider receives the response and updates its database accordingly to reflect that the response for the request has been received from the backend application.

The AggregateControl node 204 places the request in an output queue 206. Once the request is placed on the output queue 206, the backend application consumes the request, processes it, and places a backend application response into a reply queue 219. The requesting application, SDM IT-ESB, then consumes the backend application response and forwards it to the frontend application. Specifically, the backend application response is placed on MQIn 219, from which the response is forwarded to the AggregateReply node 220. The AggregateReply node 220 then sends the backend application response to the frontend application, assuming the timeout is not reached. If the timeout is reached, the AggregateReply node 220 sends the state message (e.g., a timeout response) to the frontend application, informing the frontend application that the timeout has been reached.

In addition to being placed on the output queue 206, the request is also forwarded to the AggregateRequest node 208. At the AggregateRequest node 208, the request is labeled as an aggregate request. This notifies the AggregateReply node 220 that it should expect a backend application response for at least one aggregate request. The aggregate request is then routed through router node 210 to the MQheader node 212. The MQheader node 212 adds proper header information for the aggregate request. The header information identifies in which reply queue the request is to be placed. For example, in the scenario that there are several AggregateControl and AggregateReply nodes, there is a need to identify in which reply queue the request is to be placed so that the request is forwarded to the proper AggregateReply node.

After adding the proper header information, the aggregate request is then forwarded to the SaveHttpSessionState node 214. The SaveHttpSessionState node 214 transforms the request into a state message (e.g., a timeout response for use in case of timeout). The state message is sent to another second AggregateRequest node 216 and is marked as an aggregate request. This informs the AggregateReply node 220 that it should expect to receive a response for a second aggregate request. Since the state message is a timeout response in case of timeout, it requires no response from the backend application. Therefore, the AggregateRequest node 216 sends the state message to the AggregateReply node 220 and not to the backend application. To this end, the state message is placed on the reply queue 218. The SDM IT-ESB then consumes the state message, processes it, and forwards it to the AggregateReply node 220.

The AggregateReply node 220 waits to receive a response from the backend application until the timeout is reached. If the backend application response is received before the timeout elapses, the AggregateReply node 220 forwards the response to the frontend application. When the timeout is reached, the AggregateReply node 220 no longer waits for the response from the backend application and sends the state message (e.g., a timeout response) to the frontend application.

To illustrate one example, upon receiving a first response from the backend application regarding results of processing of a first request before the timeout elapses, the AggregateReply node 220 sends the first response to a frontend application from which the first request was received. In response to the timeout for a second request elapsing, the AggregateReply node 220 sends the timeout response to a frontend application from which the second request was received. The AggregateReply node 220 utilizes three nodes for sending responses to the frontend application. The timeout response is sent through node 224, the backend application response received prior to the timeout elapsing is sent through Agg_Unwrap node 222, and the backend application response received after the timeout elapsing is sent through another node (not shown).

In the case of timeout, the request is still being processed at the backend application. Once the backend application completes its processing of the request, the backend application sends its response to the AggregateReply node 220. The AggregateReply node 220 doe not recognize this backend application response since the AggregateReply node 220 has already provided a state message (e.g., a timeout response) to the frontend application in response to the request. Therefore, the AggregateReply node 220 sends the backend application response to the mobile service provider through a node (not shown) designated for unrecognized responses.

The response (e.g., the backend application response or the timeout response) is an xml response and includes several different tags. Each tag is populated with the relevant information. For example, the response includes a type tag identifying the type of response (e.g., a successful response, a timeout response, or an error response). The backend application response can be of a successful type, providing necessary information requested by the frontend application or of an unsuccessful type, not providing necessary information requested by the frontend application and indicating an error in processing the request from the frontend application. The response also includes a status tag identifying the status of the response. For the successful response, the status is reflected as being completed. For the unsuccessful response, the status is reflected as error. For the timeout response, the status is reflected as timeout. The timeout response also includes a text, informing the frontend application that its request was queued successfully. When the request is queued successfully, the frontend application does not normally send the request again for backend processing. The response also includes an error code and an error text. In the case of timeout or a successful response, the error code is zero and the error text reflects timeout or a successful response as the case may be. In the case of an error, the error code is nonzero and the error text reflects the type of an error. The response is logged into a database. The content of the response is stored in the database of the mobile communication service provider which can be later accessed by the customer service.

When the backend application response is received after timeout, the mobile service provider updates its database to reflect that the response for the request has been received from the backend application. For example, the mobile service provider updates the database to change the timeout status of the response to a successful status. In this manner, if the customer service of the mobile service provider wants to know the result of processing the request, the customer service can retrieve the transaction history for the request from the database. The transaction history will reflect the status of the request. Similarly, the mobile service provider can inform the frontend application of the backend application response. The frontend application can then initiate transaction history request to review the response for the previously timeout request.

Figure 3:
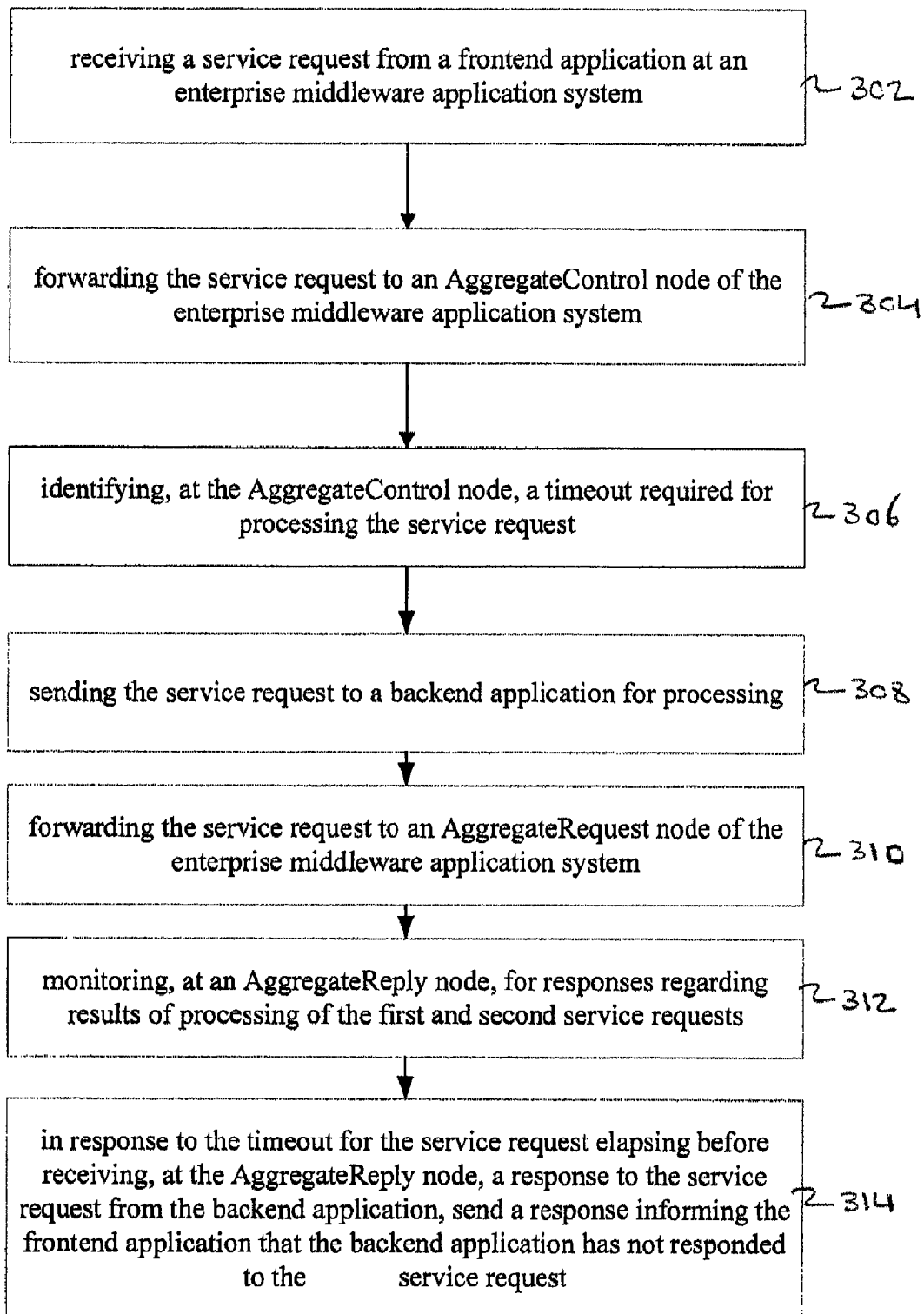
FIG. 3 illustrates an exemplary process flow for processing message traffics requesting backend processing in a manner that insures a response required for synchronous processing by requesting frontend applications

FIG. 3 illustrates an exemplary process flow for processing message traffics requesting backend processing in a manner that insures a response required for synchronous processing by requesting frontend applications. The process begins with the enterprise middleware application system receiving a service request from a frontend application (Step 302). The service request is received at the request_xform node 202, which makes the service request compliant with the format of the backend application. The request_xform 202 then forwards the service request to the AggregateControl node 204 (Step 304).

At the AggregateControl node 204 a timeout is identified for processing the service request (Step 306). As noted above, the timeout defines a time period within which a backend application response is to be sent to the frontend application. The timeout is a predefined property at the AggregateControl node 204 and is the same for the various frontend applications. The AggregateControl node 204 sends the service request to the backend application for processing (Step 308).

In addition to being sent to the backend application for processing, the service request is also forwarded to the AggregateRequest node 208 of the enterprise middleware application system (Step 310). The AggregateRequest node 208 marks the service request as an aggregate service request. This notifies the AggregateReply node 220 that it should expect a backend application response for the aggregate service request. The aggregate nodes also generate a stage message that correspond to the service request and send the stage messages to the AggregateReply node 220. As noted above, the state message is a timeout response that is sent to the frontend application when the timeout is reached. Since the state message is a timeout response in case of timeout, it requires no response from the backend application. Therefore, the AggregateRequest node 216 sends the state message to the AggregateReply node 220 and not to the backend application.

The AggregateReply node 220 also monitors for a backend application response regarding the results of processing the service request (Step 312). If the timeout is reached and the backend application response is not received at the AggregateReply node 220, the AggregateReply node 220 sends a timeout response to the frontend application informing the frontend application that the backend application has not responded to the service request (Step 314).

ID the foregoing manner, the instant application can facilitate synchronous service for frontend applications. As shown by the above discussion, functions relating to the backend and/or the frontend applications may be implemented on computers connected for data communication via the components of a packet data network as shown in FIG. 1. The middleware functions may be implemented as programming on the same or similar computer platform. Although special purpose devices may be used, such devices also may be implemented using one or more hardware platforms intended to represent a general class of data processing device commonly used to run "server" programming so as to implement the functions associated with the backend and/or applications discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the backend or frontend application server or the platform for the middleware service system. In operation, the code is stored within the general-purpose computer platform. At other times, however, the software may be stored at other locations and/or transported for loading into the appropriate general-purpose computer system.

Figures 4, 5:
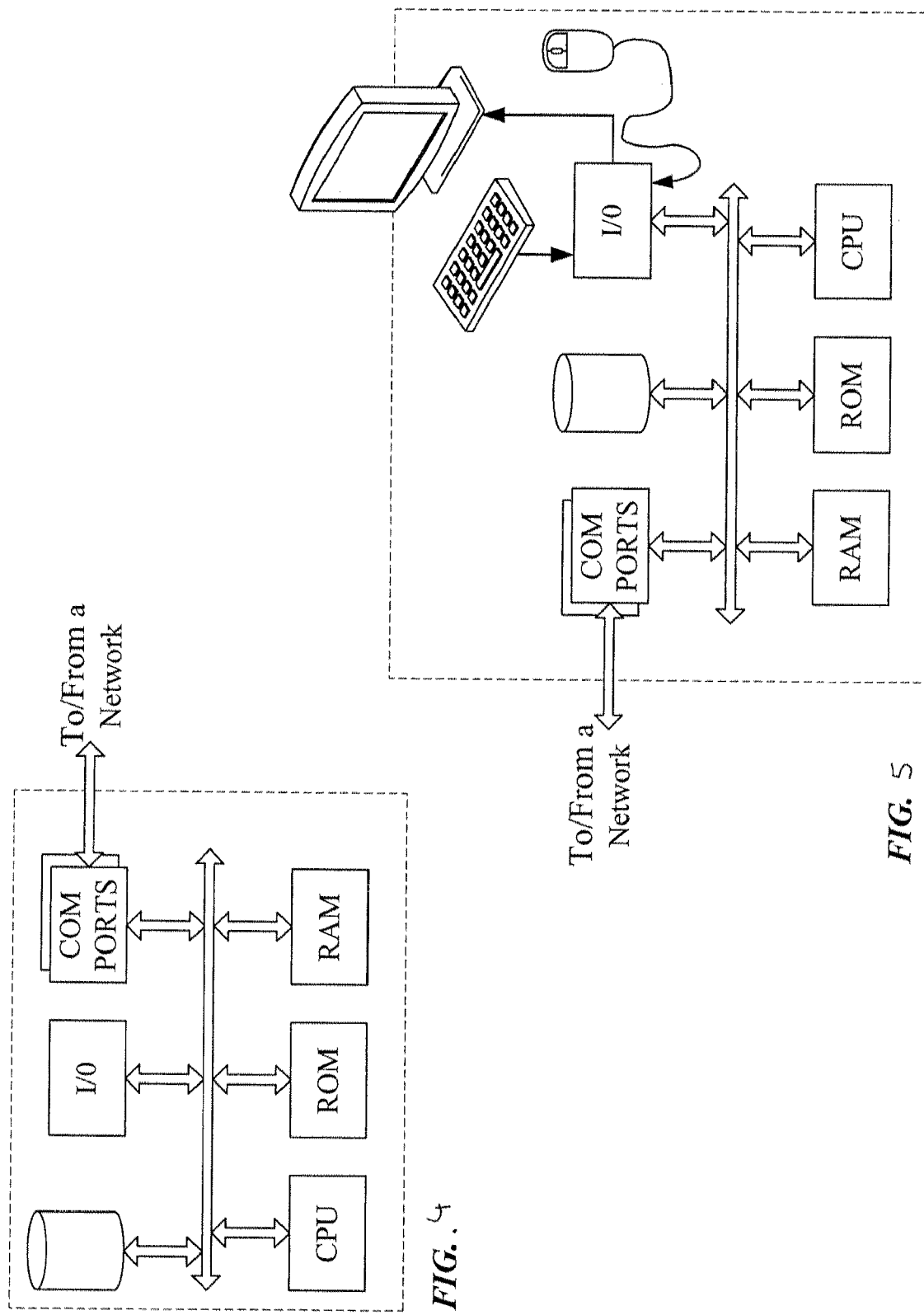
FIG. 4 is a simplified functional block diagram of a computer that may be configured as a host or server, for example, to function as the backend application in the system of FIG. 1.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of aggregating message traffic requiring backend processing in a manner that insures a response required for synchronous processing by a requesting frontend application outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the methods of aggregating message traffic requiring backend processing in a manner that insures a response required for synchronous processing by a requesting frontend application shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   (a) receiving first and second service requests from one or more frontend applications at an enterprise middleware application system;
   (b) forwarding the first and second service requests to an AggregateControl node of the enterprise middleware application system;
   (c) identifying, at the AggregateControl node, a timeout required for processing the first and second service requests;
   (d) sending the first and second service requests to a backend application for processing, and monitoring, at an AggregateReply node, for responses regarding results of processing of the first and second service requests;
   (e) upon receiving, at the AggregateReply node, a first response from the backend application regarding the result of processing of the first service request before the timeout elapses, sending the first response to a corresponding frontend application from which the first service request was received; and
   (f) in response to the timeout for the second service request elapsing before receiving, at the AggregateReply node, a second response to the second service request from the backend application, sending a third response informing the corresponding frontend application from which the second service request was received that the backend application has not responded to the second service request.

2. The method of claim 1, wherein the one or more frontend applications include one or more of an Automated Customer Support System (ACSS) server, a Subscriber Device Management User Interface (SDMUI) server, and a Point of Sale (POS) server.

3. The method of claim 1, wherein the timeout is a predefined property at the AggregateControl node.

4. The method of claim 1, wherein the AggregateControl node sends a control message to the AggregateReply node of the enterprise middleware application system, the control message identifying the timeout at the AggregateReply node.

5. The method of claim 1, wherein the first and second service requests are from the same frontend application.

6. The method of claim 1, wherein the first and second service requests are from two different frontend applications.

7. The method of claim 1, further comprising sending the first and second service requests to an AggregateRequest node of the enterprise middleware application system, wherein the AggregateRequest node marks the first and second service requests as first and second aggregate service requests, respectively.

8. The method of claim 7, further comprising:
   generating first and second stage messages that respectively correspond to the first and second service requests;
   sending the first and second stage messages to the AggregateReply node; and
   in response to the timeout for the second service request elapsing before the second response is received at the AggregateReply node, sending the second stage message as the third response and in place of the second.

9. The method of claim 1, wherein the third response includes a timeout response.

10. The method of claim 1, wherein the first and second service requests from the one or more frontend applications require synchronous responses.

11. A system comprising:
    a processing device; and
    a memory storing executable instructions for configuring the processing device to perform functions, comprising functions to:
    (a) receive first and second service requests from one or more frontend applications at an enterprise middleware application system;
    (b) forward the first and second service requests to an AggregateControl node of the enterprise middleware application system;
    (c) identifying, at the AggregateControl node, a timeout required for processing the first and second service requests;
    (d) send the first and second service requests to a backend application for processing, and monitoring, at an AggregateReply node, for responses regarding results of processing of the first and second service requests;
    (e) upon receiving, at the AggregateReply node, a first response from the backend application regarding the result of processing of the first service request before the timeout elapses, send the first response to a corresponding frontend application from which the first service request was received; and (f) in response to the timeout for the second service request elapsing before receiving, at the AggregateReply node, a second response to the second service request from the backend application, send a third response informing the corresponding frontend application from which the second service request was received that the backend application has not responded to the second service request.

12. The system of claim 11, wherein the one or more frontend applications include one or more of an Automated Customer Support System (ACSS) server, a Subscriber Device Management User Interface (SDMUI) server, and a Point of Sale (POS) server.

13. The system of claim 11, wherein the timeout is a predefined property at the AggregateControl node.

14. The system of claim 11, wherein the first and second service requests are from the same frontend application.

15. The system of claim 11, wherein the first and second service requests are from two different frontend applications.

16. The system of claim 11, wherein the memory further stores executable instructions for configuring the processing device to perform functions, comprising function to send the first and second service requests to an AggregateRequest node of the enterprise middleware application system, wherein the AggregateRequest node marks the first and second service requests as first and second aggregate service requests, respectively.

17. The system of claim 11, wherein the memory further stores executable instructions for configuring the processing device to perform functions, comprising functions to:

generate first and second stage messages that respectively correspond to the first and second service requests;

send the first and second stage messages to the AggregateReply node; and in response to the timeout for the second service request elapsing before the second response is received at the AggregateReply node, send the second stage message as the third response and in place of the second.

18. The system of claim 11, wherein the first and second service requests from the one or more frontend applications require synchronous responses.

19. A method comprising steps of:

(a) receiving a service request from a frontend application at an enterprise middleware application system;

(b) forwarding the service request to an AggregateControl node of the enterprise middleware application system;

(c) identifying, at the AggregateControl node, a timeout required for processing the service request;

(d) sending the service request to a backend application for processing, and monitoring, at an AggregateReply node, for a response regarding results of processing of the service request;

(e) in response to the timeout for the service request elapsing before receiving, at the AggregateReply node, a backend application response to the service request, sending a response informing the frontend application from which the service request was received that the backend application has not responded to the service request.

* * * * *